United States Patent
Hoshino et al.

(10) Patent No.: US 7,386,029 B2
(45) Date of Patent: Jun. 10, 2008

(54) RECEPTION DEVICE AND RECEPTION METHOD

(75) Inventors: Masayuki Hoshino, Yokosuka (JP); Takenobu Arima, Yokohama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 396 days.

(21) Appl. No.: 10/557,988

(22) PCT Filed: May 26, 2004

(86) PCT No.: PCT/JP2004/007544

§ 371 (c)(1),
(2), (4) Date: Nov. 22, 2005

(87) PCT Pub. No.: WO2004/107601

PCT Pub. Date: Dec. 9, 2004

(65) Prior Publication Data

US 2006/0280232 A1    Dec. 14, 2006

(30) Foreign Application Priority Data

May 28, 2003   (JP) ............................. 2003-150957

(51) Int. Cl.
*H04L 27/30* (2006.01)
(52) U.S. Cl. .................... 375/142; 455/137; 370/334
(58) Field of Classification Search ................. 375/142
See application file for complete search history.

(56) References Cited

U.S. PATENT DOCUMENTS

| | | | |
|---|---|---|---|
| 6,990,137 B2 * | 1/2006 | Smee et al. ................. | 375/142 |
| 7,082,174 B1 * | 7/2006 | Smee et al. ................. | 375/349 |
| 2001/0053678 A1 * | 12/2001 | Bonaccorso et al. ........ | 455/137 |
| 2003/0021246 A1 * | 1/2003 | Ling .......................... | 370/334 |
| 2003/0022649 A1 * | 1/2003 | Voyer ....................... | 455/277.1 |

FOREIGN PATENT DOCUMENTS

| | | |
|---|---|---|
| WO | 0054427 | 9/2000 |
| WO | 01 61949 | 8/2001 |

OTHER PUBLICATIONS

International Search Report dated Aug. 10, 2004.
C. Frank, et al., "Adaptive Interference Suppression for the Downlink of a Direct Sequence CDMA System with Long Spreading Sequences," University of California, pp. 1-31, Sep. 1998.

* cited by examiner

*Primary Examiner*—Creighton Smith
(74) *Attorney, Agent, or Firm*—Dickinson Wright, PLLC

(57) ABSTRACT

At noise component addition section 105, a noise equivalent value equivalent in size to noise component is calculated using a constant which is dependent on a difference of spreading factors between a common pilot channel and packet channels, and at correlation matrix and correlation vector calculation section 106, the noise equivalent value is added to diagonal elements of an autocorrelation matrix. At weight calculation section 107, an optimal weight is calculated using the autocorrelation matrix whose diagonal elements have been added the noise equivalent value, and at adaptive equalization section 108, equalization of reception signal is carried out. Thereby, noise enhancement produced in the packet channels after the equalization due to the difference between the spreading factor of the common pilot channel and the spreading factor of the packet channels can be reduced.

6 Claims, 7 Drawing Sheets

RECEPTION DEVICE AND RECEPTION METHOD

TECHNICAL FIELD

The present invention relates to a reception apparatus and a reception method for carrying out adaptive equalization in which a common pilot channel signal is used as a reference signal, and is suitable for applying to a communication terminal apparatus, for example.

BACKGROUND ART

Generally, multipath is formed between a base station apparatus and a communication terminal apparatus by reflection, diffraction, and/or dispersion of radio waves under the influence of buildings and suchlike. As a result, multiplied waves interfere mutually and generate multipath fading. In the HSDPA (High Speed Downlink Packet Access) scheme and suchlike known as high speed downlink packet transmission, since the modulation M-ary number for packet channels is as high as 16 QAM, reception performance will deteriorate severely by inter-path interferences resulting from the multipath fading.

Then, it is possible to carry out adaptive equalization in the communication terminal apparatus of the receiving side using a common pilot channel as a reference signal. Generally, in many cases, spreading factor is set to be large for the common pilot channel in order to enhance SNR (Signal to Noise Ratio), and set to be small for channels for high speed packet transmission in order to improve transmission efficiency.

FIG. 1 is a block diagram showing a configuration of a conventional reception apparatus. In this figure, signal transmitted from a base station apparatus is received at RF receiver 12 through antenna 11, and predetermined reception processing (a down conversion, A/D conversion and so forth) is carried out with the received signal (reception signal) at RF receiver 12. The signal after the reception processing is outputted to PL spread section 13 and adaptive equalization section 17.

At PL spread section 13, the signal outputted from RF receiver 12 after the reception processing is despread with a spreading code which is created in the base station apparatus by spreading the common pilot signal code-multiplexed with the reception signal, and the despread signal is outputted to channel estimation section 14 and correlation matrix and correlation vector calculation section 15.

Based on the despread common pilot signal outputted from PL spread section 13, at channel estimation section 14, phase variation component and amplitude variation component that the signal transmitted from the base station apparatus acquired on propagation path are estimated as channel estimation values, and the estimated channel estimation values are outputted to the correlation matrix and correlation vector calculation section 15.

At correlation matrix and correlation vector calculation section 15, an autocorrelation matrix of the input signal and a cross-correlation vector between the input signal and a desired signal are calculated, using the despread common pilot signal outputted from PL spread section 13. When these calculations are carried out, the channel estimation values outputted from channel estimation section 14, that is, the variations over the propagation path are taken into account. The calculated correlation matrix and correlation vector are outputted to weight calculation section 16.

At weight calculation section 16, the correlation matrix and the correlation vector outputted from the correlation matrix and correlation vector calculation section 15 are used to calculate an optimal weight based on the least square error criterion of the input signal vector, that is, tap coefficients for adaptive equalization section 17. The calculated weight is outputted to adaptive equalization section 17.

At adaptive equalization section 17, adaptive equalization of the signal outputted from RF receiver 12 after the reception processing is carried out using the weight outputted from weight calculation section 16. Thereby, interference components of the subject cell signal can be equalized. The signal after the adaptive equalization is outputted to packet CH spreading section 18.

The signal outputted from adaptive equalization section 17 is despread using spreading code for packet channels at packet CH spreading section 18, and then demodulated at demodulator 19. The demodulated signal is turbo-decoded at decoder 20 to obtain packet data.

Thus, the common pilot channel has a large spreading factor and can be detected as a known signal of high-quality in the reception apparatus, and so this common pilot channel can ensure the reliability of a known signal (reference signal) which is indispensable in the operation of the adaptive equalization section and improve performance of the adaptive equalization section.

Next, the basic of the calculation of the weight used at adaptive equalization section 17 will be explained. First, assuming that the number of feed-back tap and the number of feed-forward tap are $L_1$ and $L_2$ respectively as the tap number at adaptive equalization section 17, the input signal vector can be defined using the despread signal of the common pilot signal r(t) as follows:

$$r(n)=[r(n-L_1), \ldots ,r(n-1),r(n),r(n+1), \ldots ,r(n+L_2)]^T \quad (1)$$

Also, if a delay profile is created in interval [M1, M2], the input signal vector can be expressed by the following matrix form:

$$r(n)=Hu(n)+n(n) \quad (2)$$

where H is a propagation path matrix having $(L_1+L_2+1) \times (L_1+L_2+1+M_2-M_1)$ dimension, and u is a transmitted signal sequence having $(L_1+L_2+1+M_2-M_1)$ dimension, and H and u can be expressed as follows:

$$H = \begin{bmatrix} h(M_2) & h(M_2-1) & \cdots & h(M_1) & 0 & \cdots & 0 \\ 0 & h(M_2) & \cdots & h(M_1+1) & h(M_1) & 0 & \cdots \\ \vdots & \vdots & \vdots & \vdots & \vdots & \vdots & \vdots \\ 0 & \cdots & 0 & h(M_2) & \cdots & h(M_1+1) & h(M_1) \end{bmatrix} \quad (3)$$

and $$u(n)=[u(n-L_1-M_2), \ldots ,u(n-L_1-M_1),u(n-L_1+1-M_1), \ldots ,u(n+L_2-M_1)] \quad (4)$$

The optimal weight C based on the least square error criterion can be evaluated for this input signal vector as follows:

$$C(n)=R(n)^{-1}P(n) \quad (5)$$

where R represents the autocorrelation matrix (hereinafter referred to as "correlation matrix") of the input signal, and P represents the cross-correlation vector (hereinafter referred to as "correlation vector") between the input signal and the desired signal, and R and P can be calculated as follows:

$$R(n) = \sum_{m=1}^{n} \lambda^{n-m} r(n) r^H(n) \quad (6)$$

and $$P(n) = \sum_{m=1}^{n} \lambda^{n-m} r(n) u_1^*(n) \quad (7)$$

In equations (6) and (7), $\lambda$ is the forgetting factor, and weighted addition is carried out considering propagation variation. In addition, in Equation (7), u1 is a symbol of the common pilot channel.

Thus, if the conventional adaptive equalization section is used, reception quality can be increased by utilizing the high spreading gain for the common pilot channel to equalize interference component of the subject cell signal.

However, reception apparatus has the following problems in the above-mentioned conventional. As mentioned above, spreading factor is large for the common pilot channel in order to enhance SNR, and is small for the packet channels in order to improve transmission efficiency. Therefore, the correlation matrix and the correlation vector used in weight calculation at an adaptive equalization section are in condition in which noise and the subject cell interference component are suppressed, because of the high spreading gain of the common pilot channel. However, in the packet channels which are actual targets of equalization, since the spreading factor is lower than that of the common pilot channel, a spreading gain comparable to that of common pilot channel cannot be obtained, and noise is enhanced through operation of the adaptive equalization section. Hereinafter, more detailed explanation is given with reference to the drawings.

FIGS. 2A through 2C are conceptual diagrams showing signal components under processing in a conventional reception apparatus, and shows the sizes of the signal components schematically. FIG. 2A shows components of signal S1 outputted from RF receiver 12. Spreading suppress the common pilot channel and packet channels in size of signal component and component of the subject cell, component of other-cell and white noise occupy more than half of the whole of the components.

FIG. 2B shows the components of signal S2 outputted from PL spread section 13. It is recognized that despreading the common pilot channel of high spreading factor enlarges the components of the common pilot channel and decreases other components.

FIG. 2C shows components of signal S3 outputted from packet CH spreading section 18. It is recognized that despreading the packet channel signal obtains the spreading gain and enlarges the component of signal, and the components of the subject cell are removed by equalization. As mentioned above, although the other-cell component and white noise should be reduced by equalization, however, those components are increased by noise enhancement.

Incidentally, under the condition that noise enhancement becomes large; the demodulation performance may be inferior to that of RAKE receiver which does not mount an adaptive equalization section in the worst case.

DISCLOSURE OF INVENTION

It is an object of the present invention to provide a reception apparatus and a reception method for reducing a noise enhancement produced in packet channels after equalization due to a difference between a spreading factor of a common pilot channel and a spreading factor of packet channels.

The above object is achieved by calculating noise equivalent value equivalent to noise component in size using a constant which is dependent on the difference of the spreading factors between the common pilot channel and the packet channels, and then by carrying out calculation processing of an autocorrelation matrix and a cross-correlation vector using the noise equivalent value according to the actions of autocorrelation matrix and cross-correlation vector. In other words, the above object is achieved by adding noise component to diagonal elements of an autocorrelation matrix in autocorrelation matrix calculation, and by using an input signal vector from which all components of the input signal vector below the noise component are removed in cross-correlation vector calculation.

BEST MODE FOR CARRYING OUT THE INVENTION

Embodiments of the present invention will be explained below with reference to the accompanying drawings.

Embodiment 1

Figure 1:
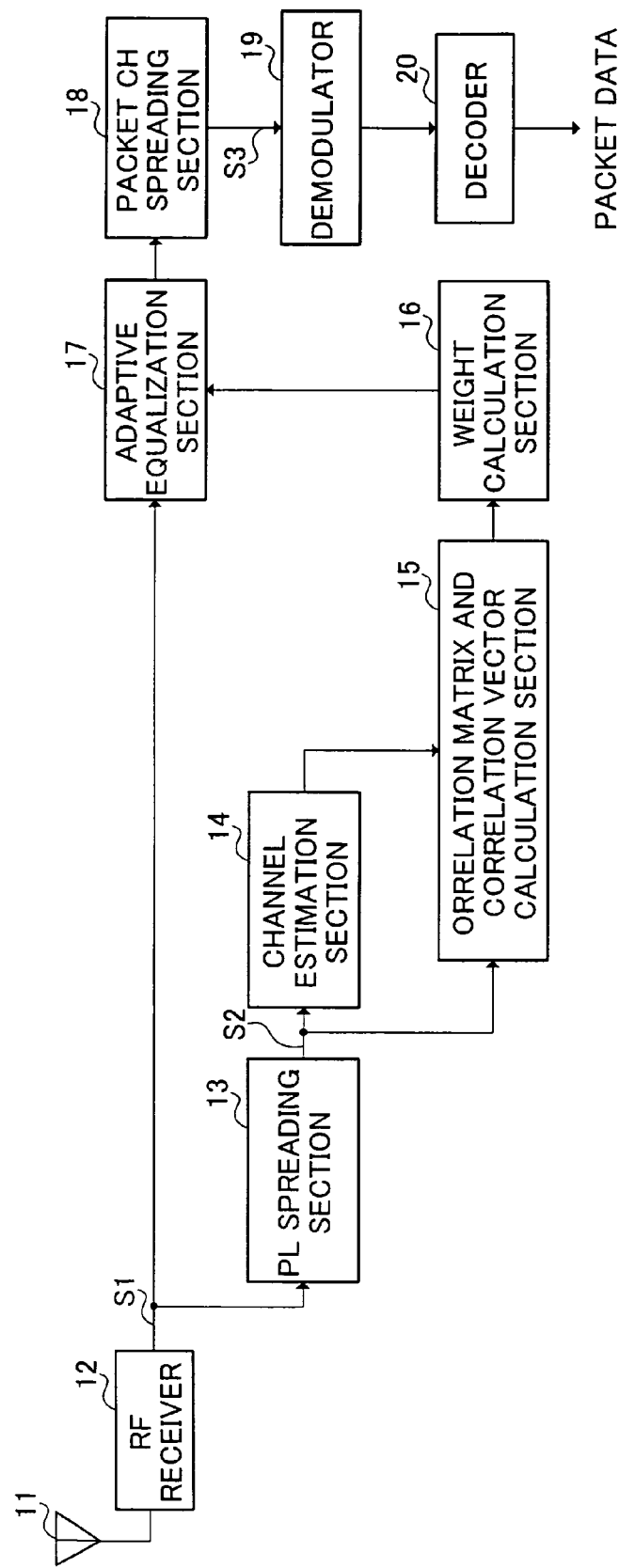
FIG. 1 is a block diagram showing a configuration of a conventional reception apparatus.
Figure 2C:
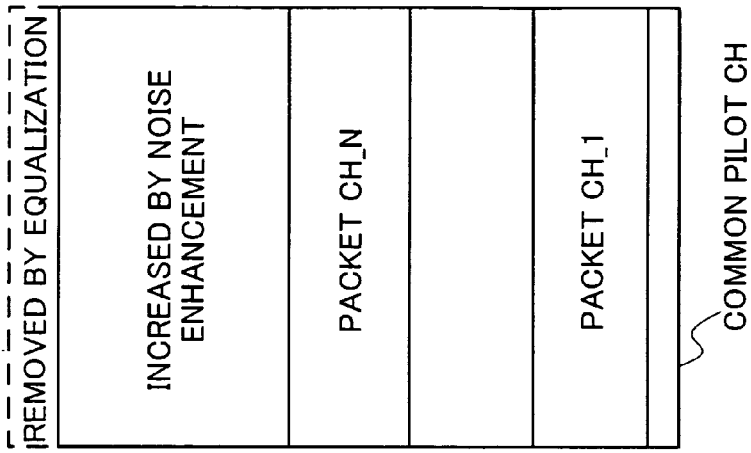
FIG. 2C is a conceptual diagram showing signal components under processing at a conventional reception apparatus.
Figure 2B:
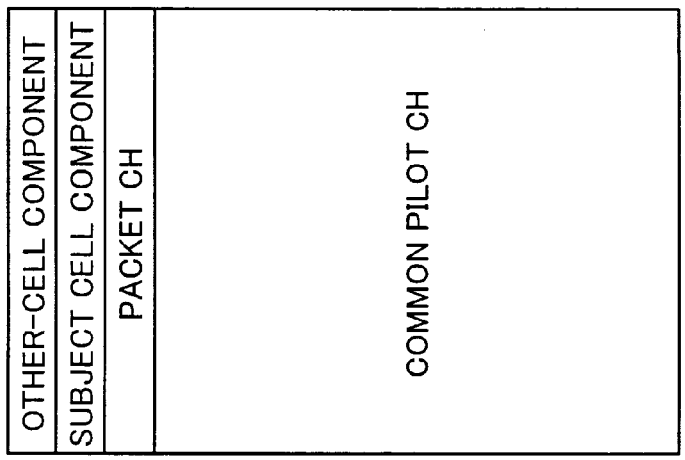
FIG. 2B is a conceptual diagram showing signal components under processing at a conventional reception apparatus.
Figure 2A:
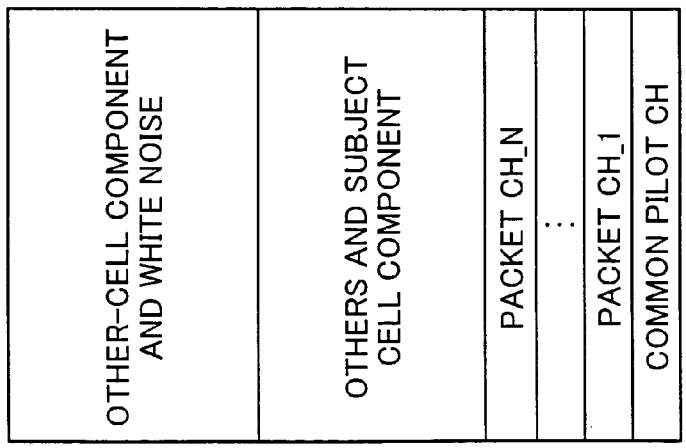
FIG. 2A is a conceptual diagram showing signal components under processing at a conventional reception apparatus.
Figure 3:
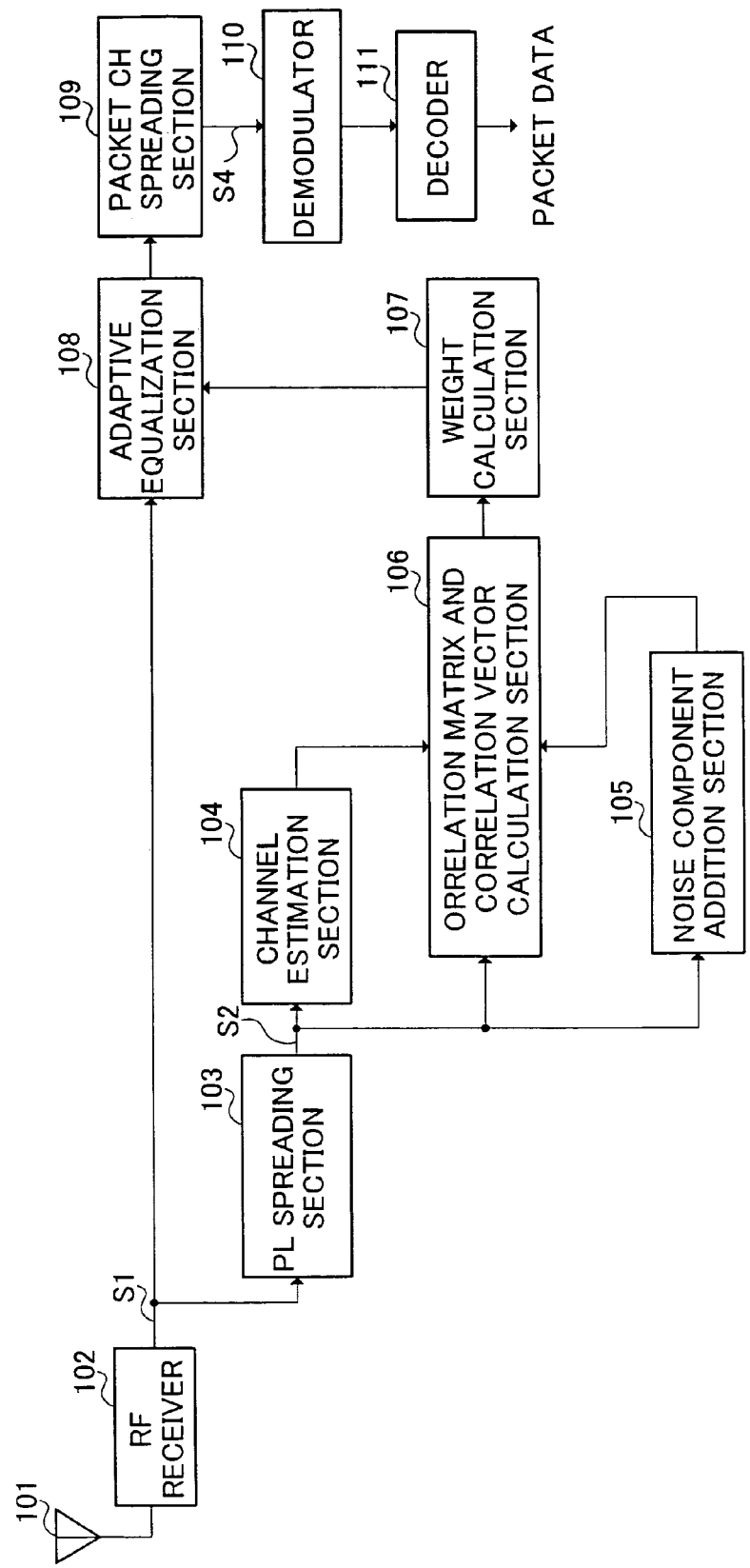
FIG. 3 is a block diagram showing a configuration of a reception apparatus in a communication terminal apparatus according to Embodiment 1 of the present invention.

FIG. 3 is a block diagram showing a configuration of a reception apparatus in a communication terminal apparatus according to Embodiment 1 of the present invention. In this figure, antenna 101 receives signal transmitted from a base station apparatus, and outputs the received signal (reception signal) to RF receiver 102.

RF receiver 102 implements predetermined radio reception processing (a down conversion, A/D conversion and suchlike) on the reception signal and outputs the signal after radio reception processing to adaptive equalization section 108 and PL spreading section 103.

PL spreading section 103 despreads the signal outputted from RF receiver 102 using spreading code created by spreading the common pilot signal in the base station apparatus, and outputs the signal after despreading to channel estimation section 104, noise component addition section 105 and correlation matrix and correlation vector calculation section 106.

Based on the signal outputted from PL spreading section 103, channel estimation section 104 calculates the phase variation component and the amplitude variation component which are given on the signal transmitted from the base station apparatus over the propagation path as channel estimation values and estimates variations over propagation path. The calculated channel estimation values are outputted to correlation matrix and correlation vector calculation section 106.

Noise component addition section 105 evaluates the maximum value of the input signal vector, max(r(n)) using the despreading result of the input signal outputted from PL spreading section 103. Then, noise component addition section 105 multiplies max(r(n)) by a constant relative SNR which is dependent on the spreading factor of the common pilot channel and the spreading factor of the packet channels and calculates as noise equivalent value noise_power equivalent in size to the noise component. The calculated noise_power is outputted to correlation matrix and correlation vector calculation section 106.

At correlation matrix and correlation vector calculation section 106, using the common pilot signal outputted from PL spreading section 103 after despreading, the autocorrelation matrix (hereinafter referred to as "correlation matrix") of the input signal, and the cross-correlation vector (hereinafter referred to as "correlation vector") between the input signal and the desired signal are calculated. The noise_power outputted from noise component addition section 105 is added to diagonal elements of the calculated correlation matrix. In addition, when the correlation matrix and the correlation vector are calculated, the channel estimation values—that is, the variations over the propagation path outputted from channel estimation section 104 are taken into account. The correlation matrix to which the noise component is added and the correlation vector are outputted to weight calculation section 107.

Weight calculation section 107 calculates a weight to be set in adaptive equalization section 108 using the calculation result outputted from correlation matrix and correlation vector calculation section 106 and outputs the calculated weight to adaptive equalization section 108.

Adaptive equalization section 108 updates the tap coefficients in adaptive equalization section 108 with the weight calculated at weight calculation section 107, and equalizes the signal outputted from RF receiver 102 and repairs waveform distortions of the signal. The signal after equalization is outputted to packet CH spreading section 109.

Packet CH spreading section 109 despreads the signal outputted from adaptive equalization section 108 using spreading code for packet channels and outputs the signal after despreading to demodulator 110.

The signal outputted from packet CH spreading section 109 after despreading is demodulated at demodulator 110, and the demodulated signal is turbo-decoded at decoder 111 to obtain packet data.

Here, the method of the weight calculation used at adaptive equalization section 108 will be explained step by step using equations. First, at noise component addition section 105, relativeSNR is calculated from the spreading factor of the common pilot channel and the spreading factor of packet channel. For example, suppose that the spreading factor of the common pilot channel is 256 and the spreading factor of the packet channel is 16. For ease of explanation, assuming that SNR of both channels before spreading is 0 [dB], the spreading gain obtained by despreading the common pilot channel is $PG_{PL}=\log_{10}(256) \approx 24$ [dB], and SNR of the common pilot channel after despreading is $SNR_{PL}=0+\log_{10}(256) \approx 24$ [dB]. On the other hand, the spreading gain obtained by despreading the packet channel is $PG_{PC}=\log_{10}(16) \approx 12$ [dB], and SNR of the packet channel after despreading is determined as $SNR_{PC}=0+\log(16) \approx 12$ [dB]. The relativeSNR is the difference between both SNR and is calculated at $PG_{PL}-PG_{PC}=\log_{10}<256/16>=\log10<16> \approx 12$ [dB]. Furthermore, this value is in agreement with SNRPL−SNRPC evaluated as a difference between both SNR.

Next, at noise component addition section 105, the following calculation is carried out using the above relativeSNR to calculate noise equivalent value noise_power equivalent to the noise component in size.

$$\text{noise\_power} = \text{relativeSNR} \times \max(r(n)) \quad (8)$$

The common pilot channel having large spreading factor contributes greatly to the suppression of the noise component, whereas the packet channels having small spreading factor cannot suppress noise component as much as the common pilot channel does. For this reason, the noise component which is dependent on the difference between the spreading factors of the common pilot channel and the packet channels is estimated using Equation (8).

Then, at correlation matrix and correlation vector calculation section 106, a correlation matrix $R_1(n)$ is determined as follows, using noise_power evaluated from Equation (8):

$$R_1(n) = \text{noise\_power} \times I + \sum_{m=1}^{n} \lambda^{n-m} r(n) r^H(n) \quad (9)$$

I: unit matrix

According to Equation (9), the noise component produced from the difference between the spreading factors of the common pilot channel and the packet channels is added to the diagonal elements of the correlation matrix. The diagonal elements of the correlation matrix, in case of white noise, for example, are added the square value of noise, and so it can be considered that strength of noise is expressed in the sizes of the diagonal elements. For this reason, adding noise component to the diagonal elements of the correlation matrix artificially like in Equation (9) can lead to deterioration of signal quality in the correlation matrix.

At weight calculation section 107, the optimal weight is calculated from Equation (5), using the result calculated from Equations (7) and (9) at correlation matrix and correlation vector calculation section 106. Here, the inverse matrix of the correlation matrix works such that the signal components of each path of multipath fading eliminate influences between the paths. In the present case, the noise component added in Equation (9) acts so as to eliminate influences between the paths accurately.

As a result, the optimal weight calculated in this way is equivalent to what is calculated by approximating SNR of the packet channels, and by carrying out equalization of the packet channels using this weight, noise enhancement can be reduced and reception quality can be improved.

Figure 4C:
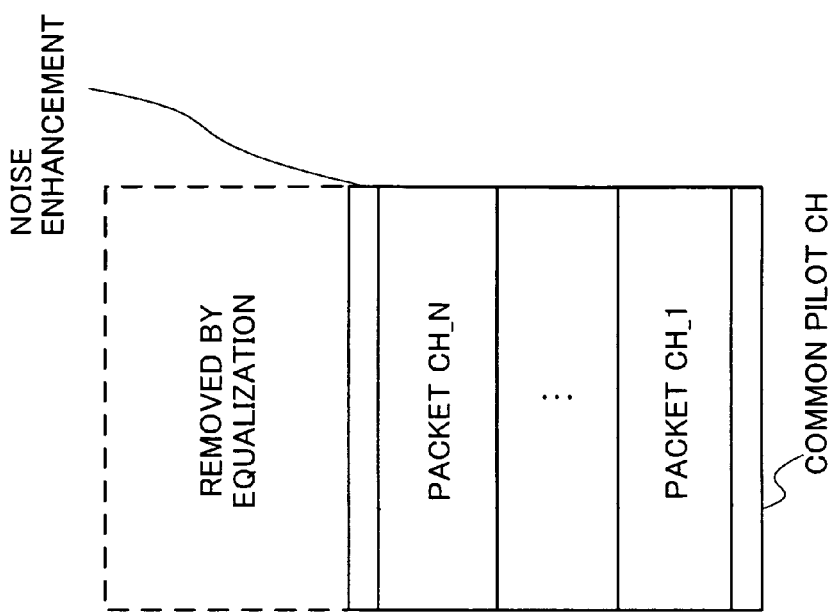
FIG. 4C is a conceptual diagram showing signal components under processing at a reception apparatus in a communication terminal apparatus according to Embodiment 1 of the present invention.
Figure 4B:
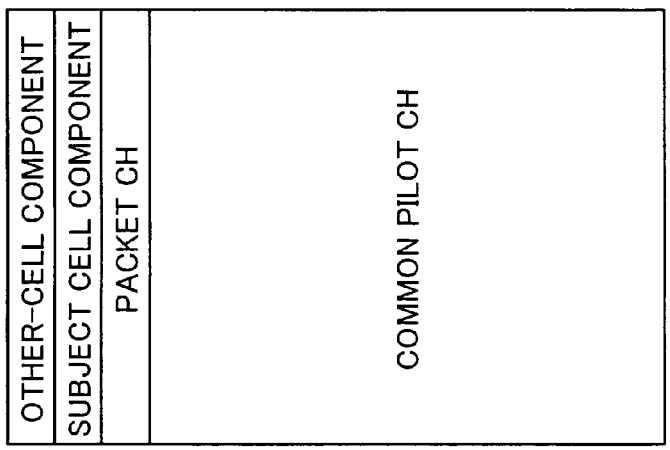
FIG. 4B is a conceptual diagram showing signal components under processing at a reception apparatus in a communication terminal apparatus according to Embodiment 1 of the present invention.
Figure 4A:
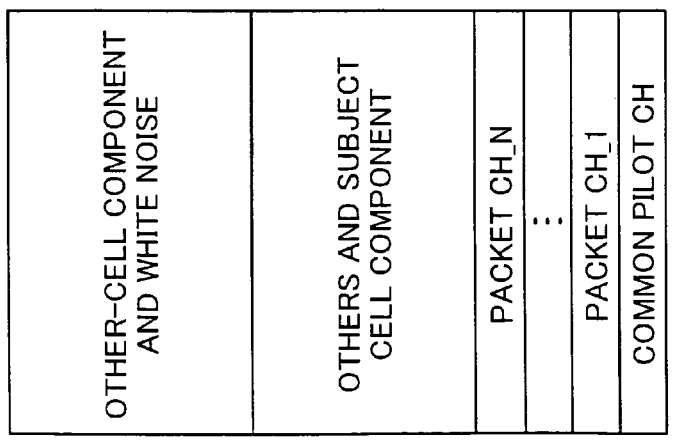
FIG. 4A is a conceptual diagram showing signal components under processing at a reception apparatus in a communication terminal apparatus according to Embodiment 1 of the present invention.

FIGS. 4A through 4C are conceptual diagrams showing signal components under processing in a reception apparatus according to Embodiment 1 of the present invention. FIGS. 4A, 4B and 4C show the components of signal S1 outputted from RF receiver 102, the components of signal S2 outputted from PL spreading section 103 and the components of signal S4 outputted from Packet CH spreading section 109, respectively.

In FIGS. 4A and 4B, the overall situation of the signal components is conventional, but in FIG. 4C, noise enhancement of other-cell component and of white noise are reduced.

Thus, according to this Embodiment, the noise equivalent value equivalent to the noise component is calculated by multiplying the maximum value in the despreading result of the common pilot channel by a constant which is dependent on the spreading factor of the common pilot channel and the spreading factor of the packet channels, the diagonal elements of the correlation matrix of the input signal vector are added to the calculated noise equivalent value and the adaptive equalization of the reception signal is performed with the weight calculated using this correlation matrix, and these make it possible to reduce the noise enhancement generated in the equalized packet channel due to the difference between the spreading factor of the common pilot channel and the spreading factor of the packet channel and to improve the reception quality of the packet channel.

Furthermore, in this Embodiment, relativeSNR defines the spreading gain determined from the spreading factor SF as $\log_{10}(SF)$, calculates values determined by adding the spreading gain to SNR before spreading for the common pilot channel and the packet channel respectively and determines the difference between the values (ratio). It is possible to further improve the reduction effect of the noise enhancement by calculating relativeSNR adding the influence of errors generated from various factors.

Embodiment 2

Figure 5:
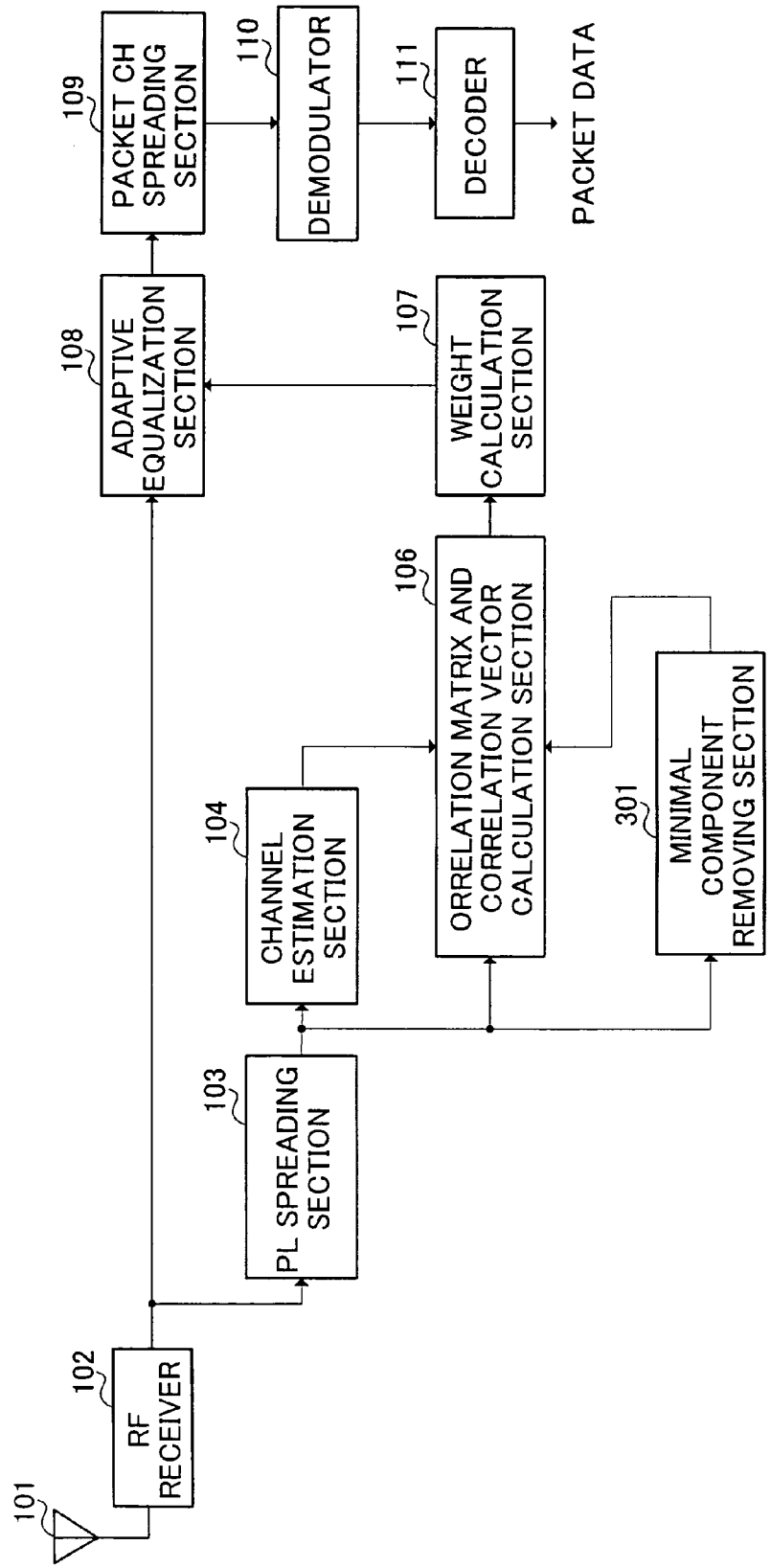
FIG. 5 is a block diagram showing a configuration of a reception apparatus in a communication terminal apparatus according to Embodiment 2 of the present invention.

FIG. 5 is a block diagram showing a configuration of a reception apparatus in a communication terminal apparatus according to Embodiment 2 of the present invention. In FIG. 5, the same parts as in FIG. 3 are assigned the same reference numerals as in FIG. 3 to omit detailed explanations thereof. The difference between FIG. 5 and FIG. 3 is that in FIG. 5, minimal component removing section 301 substitutes for noise component addition section 105 in FIG. 3.

Minimal component removing section 301 evaluates the maximum value of input signal vector max (r (n)) using despreading result of input signal outputted from PL spreading section 103. Then, minimal component removing section 301 multiplies max(r(n)) by a constant relativeSNR which is dependent on spreading factor of common pilot channel and spreading factor of packet channels and calculates a noise equivalent value noise_power, using Equation (8) explained in Embodiment 1. Furthermore, minimal component removing section 301 regards components smaller than noise_power in the input signal vector r (n) as noises and replaces those components with "0." For example, if (n−L1+1) component and (n+1) component of input signal vector r(n) are smaller than noise_power, the following equation holds:

$$r(n)=[r(n-L_1),0 \ldots ,r(n-1),r(n),0, \ldots ,r(n+L_2)]^T \qquad (10)$$

The input signal vector r(n) in which predetermined components have been replaced with "0" in that way is outputted to correlation matrix and correlation vector calculation section 106.

At correlation matrix and correlation vector calculation section 106, a correlation matrix and a correlation vector are calculated using the input signal vector r(n) outputted from minimal component removing section 301 as expressed by Equations (6) and (7), and at weight calculation section 107, an optimal weight is calculated using the correlation matrix which is calculation result of Equation (6) and the correlation vector which is a calculation result of Equation (7).

Here, the correlation vector acts so as to strengthen signal components on respective paths of multipath fading from each other. For this reason, when calculating the correlation vector, by removing the components regarded as noises in advance, the noise components can be prevented from strengthening each other. That is, it contributes to reducing noise enhancement.

Thus, according to this Embodiment, the noise enhancement produced in the packet channels after equalization due to the difference of the spreading factors between the common pilot channel and the packet channels can be reduced, by regarding components of the input signal vector smaller than the given value as noises, removing these components, calculating the correlation vector from this input signal vector and next carrying out equalization of reception signal with weight obtained using the calculated correlation vector.

Embodiment 3

Figure 6:
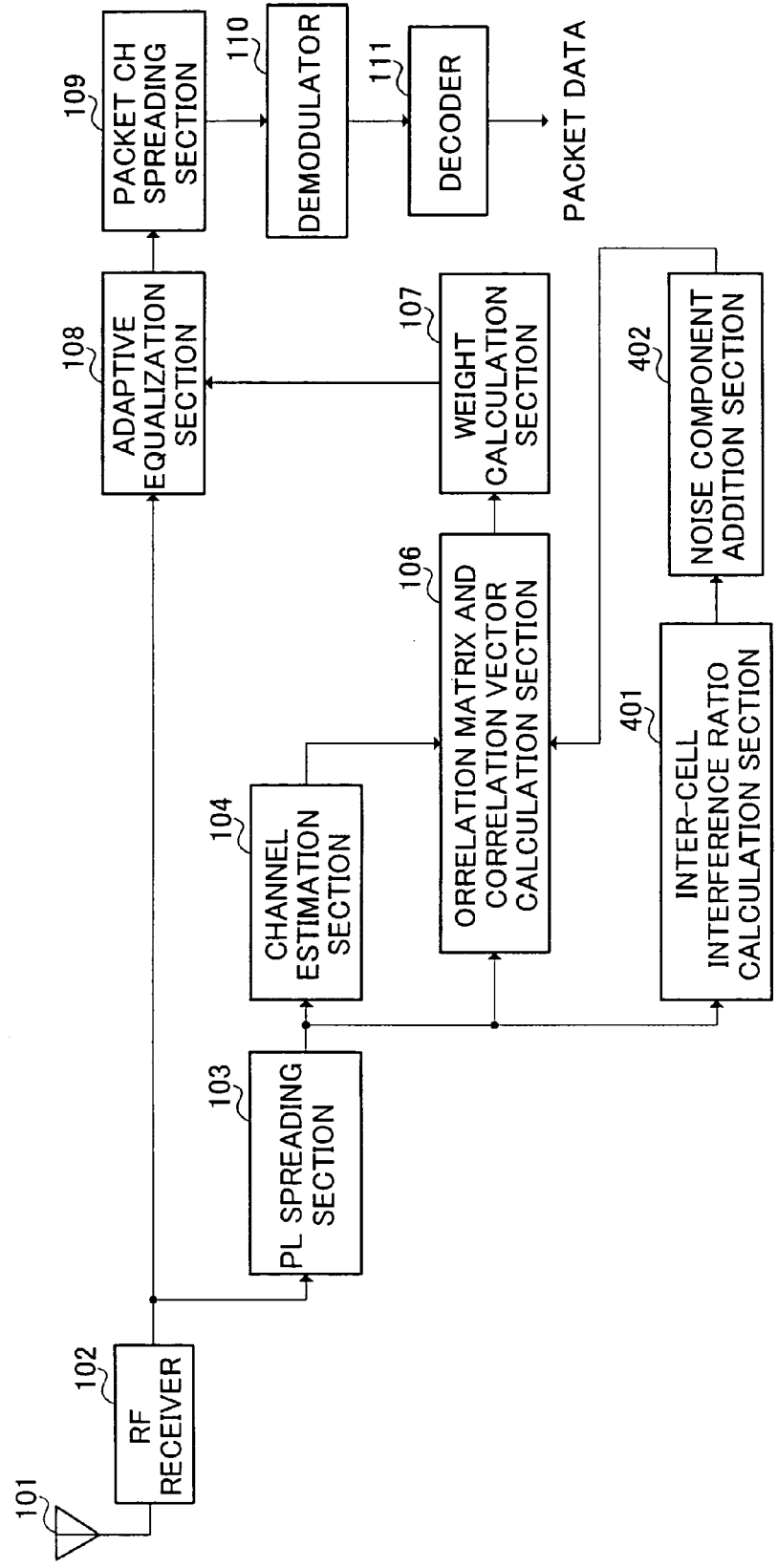
FIG. 6 is a block diagram showing a configuration of a reception apparatus in a communication terminal apparatus according to Embodiment 3 of the present invention.

FIG. 6 is a block diagram showing a configuration of a reception apparatus in a communication terminal apparatus according to Embodiment 3 of the present invention. In FIG. 6, the same parts as in FIG. 3 are assigned the same reference numerals as in FIG. 3 to omit detailed explanations thereof. The difference between FIG. 6 and FIG. 3 is that in FIG. 6, inter-cell interference ratio calculation section 401 is provided and noise component addition section 402 substitutes for noise component addition section 105 in FIG. 3

Inter-cell interference ratio calculation section 401 calculates estimatedCIR which is a ratio of the subject cell interference component to other-cell, interference component based on signal outputted from PL spreading section 103. More specifically, estimatedCIR is calculated from value obtained by averaging the input signal vector expressed by Equation (1) for a long time. The calculated estimatedCIR is outputted to noise component addition section 402.

Noise component addition section 402 multiplies estimatedCIR outputted from inter-cell interference ratio calculation section 401 by a constant relativeSNR which is dependent on the difference between spreading factors of the common pilot channel and the packet channels and calculates as noise equivalent value noise_power which is equivalent to noise component in size.

$$noise\_power=relativeSNR \times estimatedCIR \qquad (11)$$

The calculated noise_power is outputted to correlation matrix and correlation vector calculation section 106.

At correlation matrix and correlation vector calculation section 106, operation of Equation (9) by which noise_power calculated at noise component addition section 402 is added to diagonal elements of correlation matrix is carried out, and at weight calculation section 107, an optimal weight is calculated using the operation result of Equation (9).

Thus, according to this Embodiment, the noise equivalent value equivalent to the noise component is calculated by multiplying the ratio of the subject cell interference components to the other cell interference components by the predetermined value which is dependent on the difference of the spreading factors between the common pilot channel and the packet channel, the diagonal elements of the correlation matrix of the input signal vector are added to the calculated noise equivalent value and the adaptive equalization of the reception signal is performed with the weight calculated using this correlation matrix, and these make it possible to reduce the noise enhancement generated in the equalized packet channel due to the difference of the spreading factor between the common pilot channel and the packet channel and to improve the reception quality of the packet channel.

Embodiment 4

Figure 7:
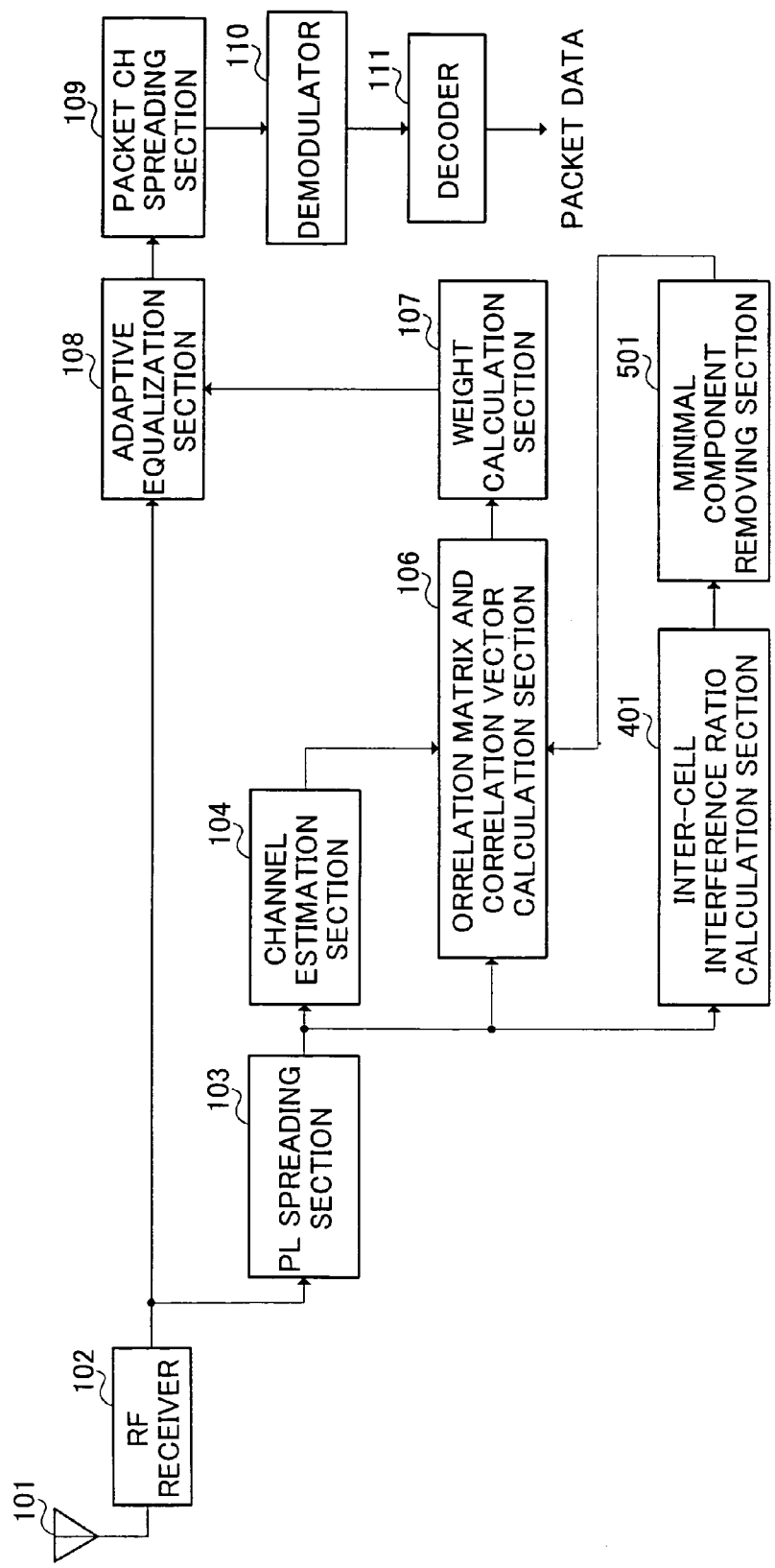
FIG. 7 is a block diagram showing a configuration of a reception apparatus in a communication terminal apparatus according to Embodiment 4 of the present invention.

FIG. 7 is a block diagram showing a configuration of a reception apparatus in a communication terminal apparatus according to Embodiment 4 of the present invention. In FIG. 7, the same portions as in FIG. 5 are assigned the same reference numerals as in FIG. 5 to omit detailed explanations thereof. The difference between FIG. 7 and FIG. 5 is that in FIG. 7, inter-cell interference ratio calculation section 401 is provided and minimal component removing section 501 substitutes for minimal component removing section 301 in FIG. 5

Inter-cell interference ratio calculation section 401 calculates estimatedCIR which is a ratio of the subject cell interference component to the other-cell interference component based on signal outputted from PL spreading section 103. More specifically, estimatedCIR is calculated from value obtained by averaging the input signal vector expressed by Equation (1) for a long time. The calculated estimatedCIR is outputted to minimal component removing section 501.

Minimal component removing section 501 multiplies the estimatedCIR outputted from inter-cell interference ratio calculation section 401 by a constant relativeSNR which is dependent on the spreading factor of the common pilot channel and the spreading factor of the packet channels to calculate noise equivalent value noise_power.

Then, minimal component removing section 501 regards components smaller than noise_power in the input signal vector r(n) as noises, and replaces those components with "0". The input signal vector r(n) in which given components have been replaced with "0" is outputted to correlation matrix and correlation vector calculation section 106.

At correlation matrix and correlation vector calculation section 106, a correlation matrix and a correlation vector are calculated using the input signal vector r(n) outputted from minimal component removing section 501 as expressed by Equations (6) and (7), and at weight calculation section 107, an optimal weight is calculated using the correlation matrix which is a calculation result of Equation (6) and the correlation vector which is a calculation result of Equation (7). Thus, according to this Embodiment, the noise enhancement produced in the packet channels after equalization due to the difference of the spreading factors between the common pilot channel and the packet channels can be reduced by calculating the noise equivalent value by multiplying the ratio of the subject cell interference component to the other-cell interference component by the given value which is dependent on the difference of the spreading factors between the common pilot channel and the packet channels, and then removing the components of the input signal vector smaller than the calculated noise equivalent value and calculating the correlation vector from this input signal vector, and next carrying out equalization of the reception signal with the weight obtained using the calculated correlation vector, and thereby reception quality of the packet channels can be increased.

As explained above, according to the present invention, when reception signal is equalized, noise enhancement produced due to the difference between the spreading factor of the common pilot channel signal and the spreading factor of the packet channel signal can be reduced by calculating noise equivalent value equivalent to noise component in size using a constant which is dependent on the difference of the spreading factors between the common pilot channel and the packet channels, and then by carrying out calculation processing of said correlation matrix and said correlation vector using the noise equivalent value depending on actions of correlation matrix and correlation vector.

This application is based on Japanese Patent Application No. 2003-150957 filed on May 28, 2003, entire content of which is expressly incorporated by reference herein.

INDUSTRIAL APPLICABILITY

The present invention is suitable for use in a communication terminal apparatus for carrying out adaptive equalization in which a common pilot channel signal is used as a reference signal.

The invention claimed is:

1. A reception apparatus for receiving a signal wherein a common pilot channel signal spread with a spreading code of a predetermined spreading factor and packet channel signals spread with a spreading code of a smaller spreading factor than the predetermined spreading factor are code-multiplexed, the reception apparatus comprising:
   a despread section that despreads the received signal with the spreading code for the common pilot channel signal;
   a noise equivalent value calculation section that calculates a value that is equivalent to a noise component in size using an input signal vector indicating a despreading result of the despread section and a constant which is dependent on a difference between the spreading factor of the common pilot channel signal and the spreading factor of the packet channel signals;
   a correlation matrix and correlation vector calculation section that calculates an autocorrelation matrix of the input signal vector and a cross correlation vector between the input signal vector and a desired signal vector using the value equivalent to the noise component in size calculated by the noise equivalent value calculation section;
   a weight calculation section that calculates a weight used for an equalization from the autocorrelation matrix and the cross correlation vector calculated by the correlation matrix and correlation vector calculator; and
   an adaptive equalization section that equalizes waveform distortions of the received signal using the weight calculated by the weight calculation section.

2. The reception apparatus according to claim 1, wherein the correlation matrix and correlation vector calculation section adds the noise equivalent value calculated by the noise equivalent value calculation section to diagonal elements of the autocorrelation matrix.

3. The reception apparatus according to claim 1, further comprising:

a minimal component removing section that removes components of the input signal vector below the noise equivalent value calculated by the noise equivalent value calculation section, wherein the correlation matrix and correlation vector calculation section that calculates the autocorrelation matrix and the cross-correlation vector using the input signal vector from which predetermined components have been removed by the minimal component removing section.

4. The reception apparatus according to claim 1, wherein the noise equivalent value calculation section multiplies a maximum value of the input signal vector by the constant which is dependent on the difference between the spreading factor of the common pilot channel signal and the spreading factor of the packet channel signals.

5. The reception apparatus according to claim 1, further comprising:

an inter-cell interference ratio calculation section that calculates a ratio of a subject cell interference component to an other-cell interference component using a time average value of the input signal vector, wherein the noise equivalent value calculation section multiplies the ratio calculated by the inter-cell interference ratio calculation section by the constant which is dependent on the difference between the spreading factor of the common pilot channel signal and the spreading factor of the packet channel signals.

6. A reception method for receiving a signal wherein a common pilot channel signal spread with a spreading code of a given spreading factor and packet channel signals spread with a spreading code of a spreading factor smaller than the given spreading factor are code-multiplexed, the reception method comprising:

a despreading step for despreading the received signal with the spreading code for the common pilot channel signal;

a noise equivalent value calculation calculating step for calculating a value equivalent in size to a noise component using an input signal vector indicating a despreading result of the despreading step and a constant which is dependent on a difference between the spreading factor of the common pilot channel signal and the spreading factor of the packet channel signals;

a correlation matrix and correlation vector calculation step for calculating an autocorrelation matrix of the input signal vector and a cross-correlation vector between the input signal vector and a desired signal vector using the value equivalent in size to the noise component calculated by the noise equivalent value calculation step;

a weight calculation step for calculating a weight used for an equalization from the autocorrelation matrix and the cross-correlation vector calculated by the correlation matrix and correlation vector calculation step; and an adaptive equalization step for equalizing waveform distortions of the received signal using the weight calculated by the weight calculation step.

* * * * *